US011740655B2

(12) United States Patent
Jang et al.

(10) Patent No.: US 11,740,655 B2
(45) Date of Patent: Aug. 29, 2023

(54) FOLDABLE WINDOW AND DISPLAY DEVICE INCLUDING THE SAME

(71) Applicant: Samsung Display Co., Ltd., Yongin-si (KR)

(72) Inventors: Seokwon Jang, Seoul (KR); Chul Ho Jeong, Seoul (KR); Dasom Gu, Asan-si (KR); Yongchan Jeon, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 87 days.

(21) Appl. No.: 17/335,150

(22) Filed: Jun. 1, 2021

(65) Prior Publication Data
US 2022/0057834 A1   Feb. 24, 2022

(30) Foreign Application Priority Data

Aug. 24, 2020  (KR) ........................ 10-2020-0105947

(51) Int. Cl.
*G06F 1/16* (2006.01)
*B32B 25/08* (2006.01)

(52) U.S. Cl.
CPC ............ *G06F 1/1616* (2013.01); *B32B 25/08* (2013.01); *G06F 1/1652* (2013.01)

(58) Field of Classification Search
CPC .................................................. G06F 1/1652
See application file for complete search history.

(56) References Cited

U.S. PATENT DOCUMENTS

| 9,450,038 | B2 * | 9/2016 | Kwon ................. H01L 51/5237 |
| 9,724,869 | B2 * | 8/2017 | Niskala ................. G06F 1/1652 |
| 9,865,844 | B1 * | 1/2018 | Park ..................... H01L 51/0097 |
| 9,886,063 | B2 * | 2/2018 | Yoo ........................ G06F 3/0443 |
| 10,793,747 | B2 * | 10/2020 | Park ......................... C08G 59/20 |
| 10,833,132 | B2 * | 11/2020 | Shigemura .......... H01L 51/5253 |
| 11,027,647 | B2 * | 6/2021 | Scott ......................... B60Q 3/80 |
| 11,453,193 | B2 * | 9/2022 | Cosgrove .................. B32B 7/08 |
| 2013/0083496 | A1 * | 4/2013 | Franklin ............. G09G 3/3208 361/752 |
| 2014/0065326 | A1 * | 3/2014 | Lee ........................ G06F 1/1652 428/12 |
| 2014/0138643 | A1 * | 5/2014 | Choi ................... H01L 27/3267 257/40 |
| 2015/0207102 | A1 * | 7/2015 | Jeong ...................... G06F 1/1652 257/40 |

(Continued)

FOREIGN PATENT DOCUMENTS

| KR | 1020160081831 A | 7/2016 |
| KR | 1020180136038 A | 12/2018 |

(Continued)

*Primary Examiner* — Adrian S Wilson
(74) *Attorney, Agent, or Firm* — CANTOR COLBURN LLP

(57) ABSTRACT

A foldable window includes a first film having a modulus, a second film which faces the first film, is closer to a display panel of the display device than the first film and has a modulus, and an adhesive layer which is between the first film and the second film, bonds the first film to the second film. The modulus of the first film and the modulus of the second film are both equal to or more than about 7 gigapascals.

20 Claims, 10 Drawing Sheets

(56) References Cited

U.S. PATENT DOCUMENTS

| | | | | |
|---|---|---|---|---|
| 2016/0098120 | A1* | 4/2016 | Miyake | G06F 1/163 |
| | | | | 345/174 |
| 2016/0152875 | A1* | 6/2016 | No | C09J 133/06 |
| | | | | 359/893 |
| 2016/0155965 | A1* | 6/2016 | Kusuura | G06F 1/1652 |
| | | | | 29/829 |
| 2016/0192474 | A1* | 6/2016 | Niskala | G06F 1/1652 |
| | | | | 361/679.55 |
| 2016/0315123 | A1* | 10/2016 | Kim | H01L 27/3272 |
| 2017/0031389 | A1* | 2/2017 | Yoo | G06F 3/0443 |
| 2017/0084673 | A1* | 3/2017 | Lee | G06F 1/1652 |
| 2017/0243927 | A1* | 8/2017 | Jeong | G06F 3/044 |
| 2017/0278900 | A1* | 9/2017 | Yang | G06F 3/0446 |
| 2017/0373281 | A1* | 12/2017 | Park | H01L 51/524 |
| 2018/0142127 | A1* | 5/2018 | Park | C08G 59/22 |
| 2018/0308903 | A1* | 10/2018 | Jeong | H01L 27/3276 |
| 2018/0354227 | A1* | 12/2018 | Park | B32B 5/12 |
| 2018/0356859 | A1* | 12/2018 | Hamburgen | G06F 3/0412 |
| 2019/0011954 | A1* | 1/2019 | Chu | B32B 7/12 |
| 2019/0019845 | A1* | 1/2019 | Jeong | G06F 3/0443 |
| 2019/0023860 | A1 | 1/2019 | Kim et al. | |
| 2019/0143638 | A1 | 5/2019 | Park et al. | |
| 2020/0081162 | A1* | 3/2020 | Park | H01L 51/5253 |
| 2021/0191468 | A1* | 6/2021 | Nakamura | G06F 3/04164 |
| 2022/0009200 | A1* | 1/2022 | Gu | B32B 27/06 |
| 2022/0043538 | A1* | 2/2022 | Kishimoto | G06F 3/0443 |
| 2022/0091689 | A1* | 3/2022 | Kishimoto | G06F 1/1643 |
| 2022/0164045 | A1* | 5/2022 | Kishimoto | C09J 5/06 |
| 2022/0308624 | A1* | 9/2022 | Gu | G06F 1/1656 |
| 2022/0310947 | A1* | 9/2022 | Kishimoto | B32B 7/12 |
| 2022/0317791 | A1* | 10/2022 | Kishimoto | G06F 3/046 |

FOREIGN PATENT DOCUMENTS

| | | |
|---|---|---|
| KR | 1020190056474 A | 5/2019 |
| KR | 10-2027571 B1 | 10/2019 |
| KR | 10-2031556 B1 | 10/2019 |
| KR | 10-2040358 B1 | 11/2019 |

* cited by examiner

FOLDABLE WINDOW AND DISPLAY DEVICE INCLUDING THE SAME

This U.S. non-provisional patent application claims priority to Korean Patent Application No. 10-2020-0105947, filed on Aug. 24, 2020, and all the benefits accruing therefrom under 35 U.S.C. § 119, the entire contents of which are hereby incorporated by reference.

BACKGROUND

(1) Field

The disclosure herein relates to a foldable window and a display device including the same. More particularly, the disclosure relates to a foldable window with improved durability and impact resistance and a display device including the same.

(2) Description of the Related Art

Display devices provide information to a user by displaying various images on a display screen. In general, display devices display information within an allocated display screen. Display devices may be utilized to display images on various electronic devices such as smartphones, notebook computers and televisions.

Flexible display devices including a foldable flexible display panel have been developed. Unlike rigid display devices, flexible display devices may be foldable, rollable or bendable. A flexible display device which is variously changeable in shape may be easily transported to improve convenience to a user.

SUMMARY

The disclosure provides a foldable window of a display device which has improved durability and impact resistance, and a display device including the foldable window.

An embodiment provides a foldable window including a first film having a modulus, a second film which faces the first film, is closer to a display panel of the display device than the first film and has a modulus, and an adhesive layer which is between the first film and the second film, bonds the first film to the second film. The modulus of the first film and the modulus of the second film are both equal to or more than about 7 gigapascals (GPa).

In an embodiment, each of the first film and the second film may include a polyimide copolymer, a polyamide copolymer or a polyimide-polyamide copolymer.

In an embodiment, each of the thicknesses of the first film and the second film may be equal to or more than about 10 micrometers (μm) and equal to or less than about 35 μm.

In an embodiment, each of the moduli of the first film and the second film may be equal to or more than about 7 GPa and equal to or less than about 15 GPa.

In an embodiment, a thickness of the adhesive layer may be equal to or more than 1 micrometer (μm) and equal to or less than about 5 μm.

In an embodiment, the adhesive layer has an adhesive strength forming an interface with both the first film and the second film, and the adhesive strength of the adhesive layer may be equal to or more than about 7 newtons per 20 millimeters (N/20 mm).

In an embodiment, the adhesive layer may include an epoxy resin or a urethane acrylate resin.

In an embodiment, the first film and the second film may include the same material.

In an embodiment, the foldable window may further include a third film on the first film or the second film, and the modulus of the third film may be equal to or more than about 7 GPa.

In an embodiment, the foldable window may further include a hard coating layer on the first film to define an impact-resistant layer.

In an embodiment, the hard coating layer may include a water-repellent or oil-repellent substance (e.g., material).

In an embodiment, the foldable window may further include an inorganic layer, the inorganic layer may contact at least one of a surface of the first film or the second film and be separated from the adhesive layer.

In an embodiment, a thickness of the inorganic layer may be equal to or more than about 5 angstroms (Å) and equal to or less than about 500 (Å).

In an embodiment, a moisture vapor transmission rate of the foldable window may be equal to or more than about 0.01 gram per meter squared per day (g/m$^2$·day) and equal to or less than about 10 grams per meter squared per day (g/m$^2$·day).

Another embodiment provides a display device including a display module which is foldable, and a foldable window facing the display module and foldable with the display module. The foldable window includes a plurality of films and at least one adhesive layer which bonds the plurality of films to each other. An adhesive strength of the adhesive layer is about 7 N/20 mm or more and a thickness of the adhesive layer is about 5 μm or less.

In an embodiment, a thickness of the foldable window may be about 40 μm to about 100 μm.

In an embodiment, each of the moduli of the plurality of films may be about 7 GPa to about 15 GPa.

In an embodiment, each of the plurality of films may include a polyimide copolymer, a polyamide copolymer or a polyimide-polyamide copolymer.

In an embodiment, the foldable window may further include a hard coating layer (i.e. an impact-resistant layer) as the uppermost film among the plurality of films and the hard coating layer may include a water-repellent or oil-repellent substance.

In an embodiment, the foldable window may further include an inorganic layer in contact with at least one of an upper surface of the uppermost film among the plurality of films or a lower surface of the lowermost film among the plurality of films.

A thickness of the inorganic layer may be about 5 Å to about 500 Å.

BRIEF DESCRIPTION OF THE DRAWINGS

The accompanying drawings are included to provide a further understanding of the invention, and are incorporated in and constitute a part of this specification. The drawings illustrate embodiments of the invention and together with the description, serve to explain the invention. In the drawings.

DETAILED DESCRIPTION

Figure 1:
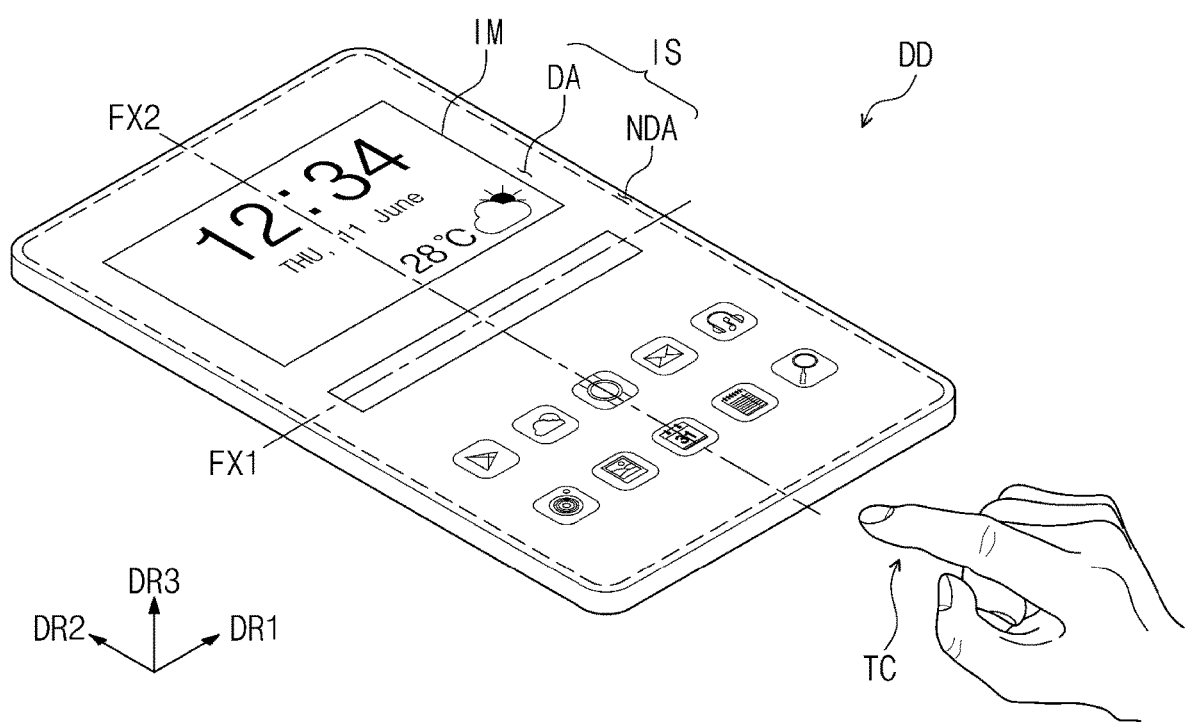
FIG. 1 is a perspective view of an embodiment of a display device.

In the invention, various changes and modifications may be made and various forms may be applied, and embodiments are illustrated in the drawings and will be described in detail in this specification. However, the invention should not be limited to these embodiments and it will be understood that all changes, modifications, equivalents, and substitutes included in the spirit and scope of the invention should be included herein.

It will be understood that when an element (area, layer, portion, or the like) is referred to as being related to another element such as being "on," "connected to" or "coupled to" another element, it can be directly on, connected or coupled to the other element or intervening elements may be present. In contrast, when an element (area, layer, portion, or the like) is referred to as being related to another element such as being "directly on," "directly connected to" or "directly coupled to" another element, no intervening element is present.

Like reference numerals refer to like elements throughout. The thickness and the ratio and the dimension of the element are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention. Similarly, a second element, component, region, layer or section could be termed a first element, component, region, layer or section.

Besides, spatially relative terms, such as "below," "lower," "above," "upper" and the like, may be used herein for ease of description to describe one element or feature's relationship to another element(s) or feature(s) as illustrated in the figures. The terms used herein are relative concepts and described on the basis of directions in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprise," "include" or "have" when used in this specification, specify the presence of stated features, integers, steps, operations, elements, components and/or groups thereof, but do not preclude the presence or addition of one or more other features, integers, steps, operations, elements, components, and/or groups thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A flexible display device which is variously changeable in shape, may be easily transported to improve convenience to a user. However, a foldable flexible display device has a limitation of being vulnerable to external impact.

Hereinafter, embodiments of a foldable window WM and a display device DD including the same will be described in detail with reference to the accompanying drawings.

FIG. 1 is a perspective view of an embodiment of a display device DD. FIGS. 2A to 2D are perspective views illustrating embodiments of the display device DD illustrated in FIG. 1 which is folded.

Referring to FIG. 1, the display device DD has a rectangular shape with short sides extended along a first direction DR1 and long sides extended along a second direction DR2 which crosses the first direction DR1. However, the shape of the display device DD is not limited thereto, and various shapes of the display device DD may be provided.

As illustrated in FIG. 1, a front surface of the display device DD may be defined as a display surface IS. The display surface IS may be in plane which is parallel to a plane defined by the first direction DR1 and the second direction DR2 crossing each other. The display surface IS may display an image IM in a third direction DR3 which crosses each of the first direction DR1 and the second direction DR2. The third direction DR3 may define a thickness direction of the display device DD and various members thereof.

An upper surface (or front surface) and a lower surface (or rear surface) of each member are defined on the basis of a direction in which the image IM is displayed. The upper and lower surfaces may face each other along the third direction DR3, and a normal direction to each of the upper and lower surfaces may be parallel to the third direction DR3.

Directions indicated by the first to third directions DR1, DR2 and DR3 are relative concepts, and may thus be changed into other directions. Hereinafter, the above-described first to third directions are the directions respectively indicated by the first to third directions DR1, DR2 and DR3, and denoted as like reference symbols.

The display surface IS of the display device DD may have a display area DA and a non-display area NDA defined therein. The display area DA may be a region or planar area in which the image IM is displayed, and the image IM may be visually recognizable from outside the display device DD at the display area DA. The image IM may be a dynamic image or a static image. FIG. 1, FIG. 2B and FIG. 2D illustrate a plurality of application icons as an example of the image IM. Various components or members of the display device DD may include a display area DA and a non-display area NDA corresponding to those described above for the display device DD.

The display area DA may have a rectangular shape in a plan view (e.g., along the third direction DR3). The non-display area NDA is adjacent to the display area DA. The non-display area NDA may surround the display area DA. However, this is illustrated as an example, and the non-display area NDA may be disposed adjacent to only one side of the display area DA, or may be omitted. The display device DD may include various embodiments and is not limited to one embodiment.

One or more embodiment of the display device DD may be not only a large display device such as a television, a display monitor or the like, but also a small or medium display device such as a mobile phone, a tablet computer, a vehicle navigation unit, a game machine or the like. These are only presented as examples. Thus, the display device DD may be not limited to any one embodiment.

The display device DD may sense an external input TC applied from outside the display device DD. The external input TC includes various types of inputs such as light, heat or pressure and may be applied through various input tools such as a body part, a pen, etc. In FIG. 1, a body part is illustrated as the external input TC applied to the front surface of the display device DD. However, this is illustrated as an example, and the external input TC may be provided in various types as described above. In addition, the display device DD may also sense the external input TC which is applied to a side surface or rear surface of the display device DD according to the structure of the display device DD, and is not limited to any one embodiment.

The display device DD may activate the display surface IS to display the image IM and sense the external input TC as well. In an embodiment, a region or planar area in which the external input TC is sensed is illustrated as being provided in the display area DA at which the image IM is displayed. However, this is illustrated as an example, and the region in which the external input TC is sensed may be provided in the non-display area NDA or in all regions of the display surface IS.

The display device DD may be a foldable display device. The display device DD may be foldable or bendable about folding axes which respectively extend in a direction.

The folding axes may respectively extend along one direction among the first direction DR1 or the second direction DR2. In an embodiment, the folding axis FX extending along the first direction DR1 is defined as a first folding axis FX1, and the folding axis FX extending in the second direction DR2 is defined as a second folding axis FX2. The folding axes may extend along or parallel to the long side and/or the short side of the display device DD. The display device DD may be foldable about either of or both of the folding axes.

The display device DD may have a plurality of regions defined therein, according to types of operation. The plurality of regions may be divided into a folding area provided in plural including folding areas and a non-folding area provided in plural including non-folding areas. The folding areas may be defined between two of the non-folding areas.

The folding areas are regions or planar areas at which the display device DD is foldable about one or more of the folding axes and in which a curvature of the display device DD is defined by folding thereof. The non-folding areas may be respectively adjacent to opposing sides of a folding area. The non-folding area may be a region or planar area at which the display device DD is not foldable or at which the display device DD remains flat even when the display device DD if folded about a folding axis FX thereof.

Figure 2A:
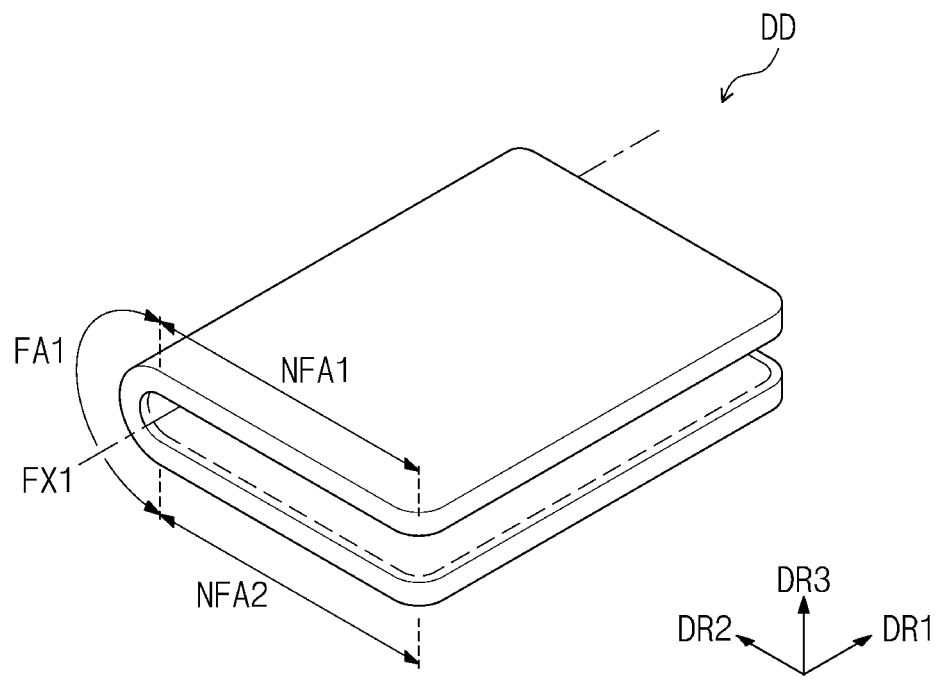
FIG. 2A is a perspective view illustrating the display device illustrated in FIG. 1 which is folded.
Figure 2B:
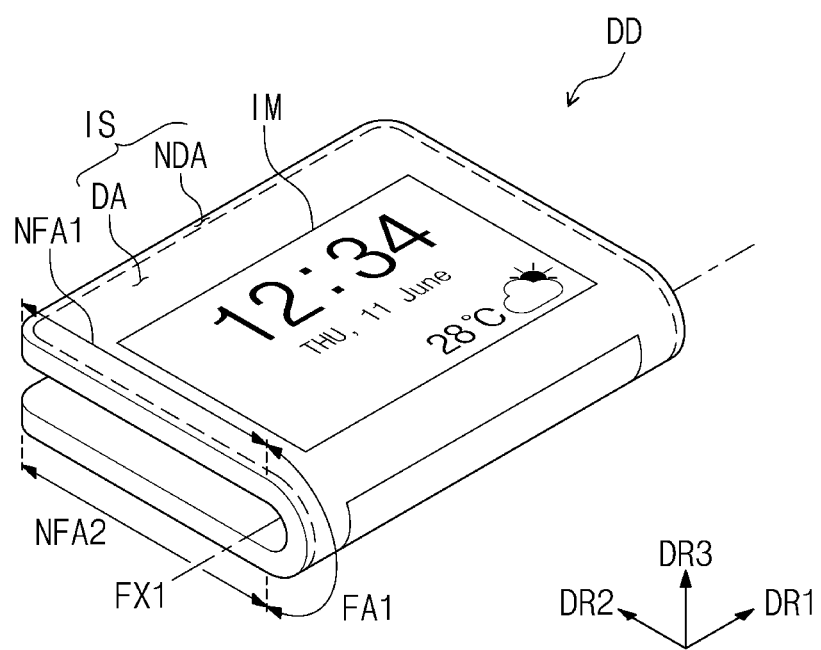
FIG. 2B is a perspective view illustrating the display device illustrated in FIG. 1 which is folded.

As illustrated in FIGS. 2A and 2B, in a direction along the display surface IS, a first non-folding area NFA1 may be adjacent to a first side of a first folding area FA1 along the second direction DR2, and a second non-folding area NFA2 may be adjacent to a second side of the first folding area FA1 along the second direction DR2, where the second side is opposite to the first side along the second direction DR2.

Figure 2C:
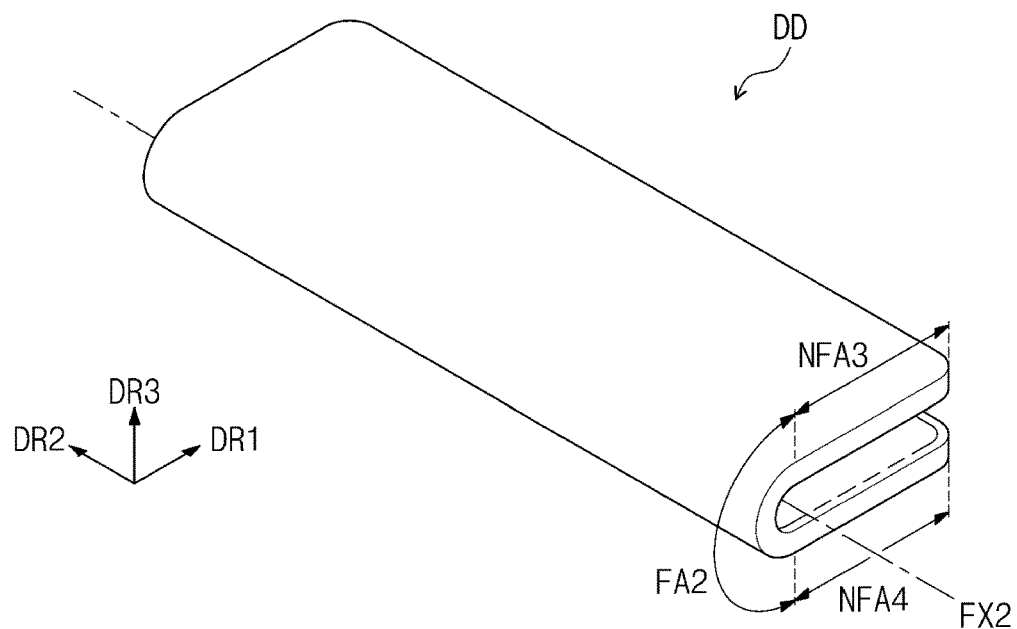
FIG. 2C is a perspective view illustrating the display device illustrated in FIG. 1 which is folded.
Figure 2D:
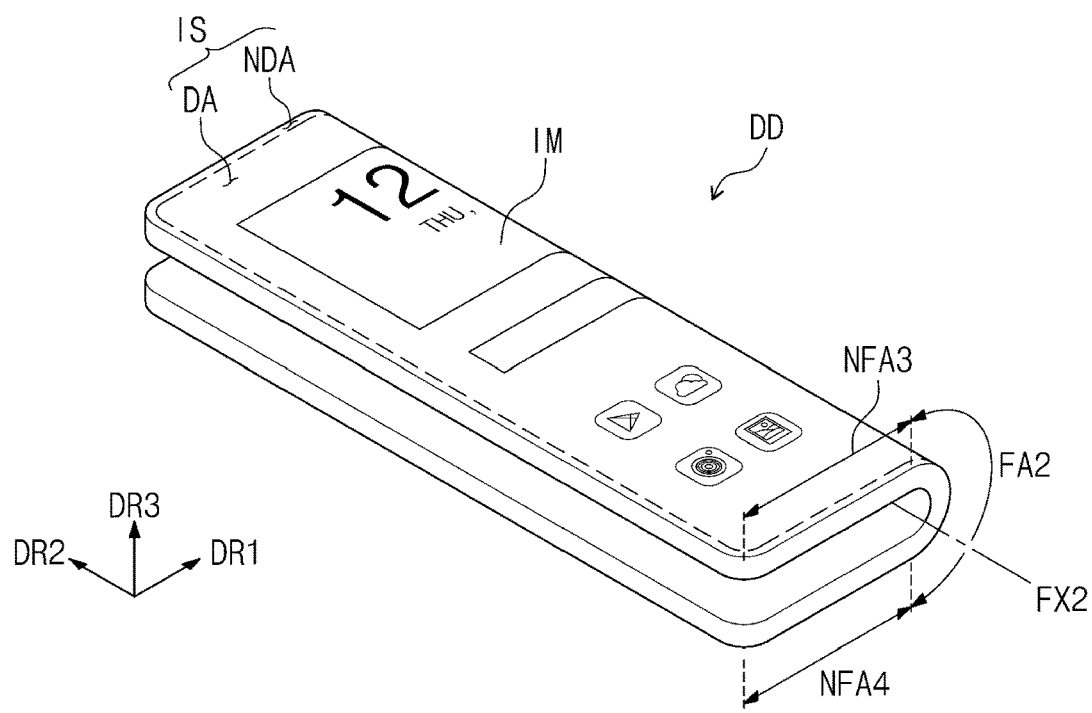
FIG. 2D is a perspective view illustrating the display device illustrated in FIG. 1 which is folded.

As illustrated in FIGS. 2C and 2D, a third non-folding area NFA3 may be adjacent to a first side of a second folding area FA2 along the first direction DR1, and a fourth non-folding area NFA4 may be adjacent to a second side of the second folding area FA2 along the first direction DR1, where the second side is opposite to the first side along the first direction DR1.

The display device DD may be in-foldable and/or out-foldable. In-folding is defined as folding of the display device DD so that portions of the display surface IS and the non-folding areas other may face each other, and out-folding is defined as folding of the display device DD so that portions of the display surface IS and the non-folding areas may face outward (e.g., to outside the display device DD). That is, the display device DD which is out-folded includes the rear surface of the display device DD which is folded such that portions of the rear surface face each other.

The display device DD may be both in-foldable and out-foldable, or may be only one of in-foldable and out-foldable. Various components or members of the display device DD may be foldable together with each other.

FIG. 2A illustrates that the display device DD illustrated in FIG. 1 is in-folded along the first folding axis FX1, and FIG. 2B illustrates that the display device DD illustrated in FIG. 1 is out-folded along the first folding axis FX1. FIG. 2C illustrates that the display device DD illustrated in FIG. 1 is in-folded along the second folding axis FX2, and FIG. 2D illustrates that the display device DD illustrated in FIG. 1 is out-folded along the second folding axis FX2.

Referring to FIGS. 2A and 2C, the display device DD may be in-foldable by bending so that portions of the front surface of the display device DD face each with respect to the folding axes. Thus, the display surface IS of the display device DD which is in-folded may be protected from elements or environment outside of the display device DD.

Referring to FIGS. 2B and 2D, the display device DD may be out-foldable by bending so that portions of the rear surface of the display device DD face each other with respect to the folding axes. The display device DD may display an image IM to outside the display device DD when portions of the display surface IS at the non-folding areas are exposed to outside the display device DD. Portions of the display surface IS at the folding areas which are exposed to outside the display device DD may also display the image IM.

The plurality of non-folding areas and folding areas may each display images which provide multiple pieces of information independent of each other, or may respectively display portions of an image which collectively provide a single piece of information.

In an embodiment, one folding area is defined in the display device DD, but the invention is not limited thereto. According to an embodiment, the display device DD may have a plurality of folding areas defined therein.

Figure 3:
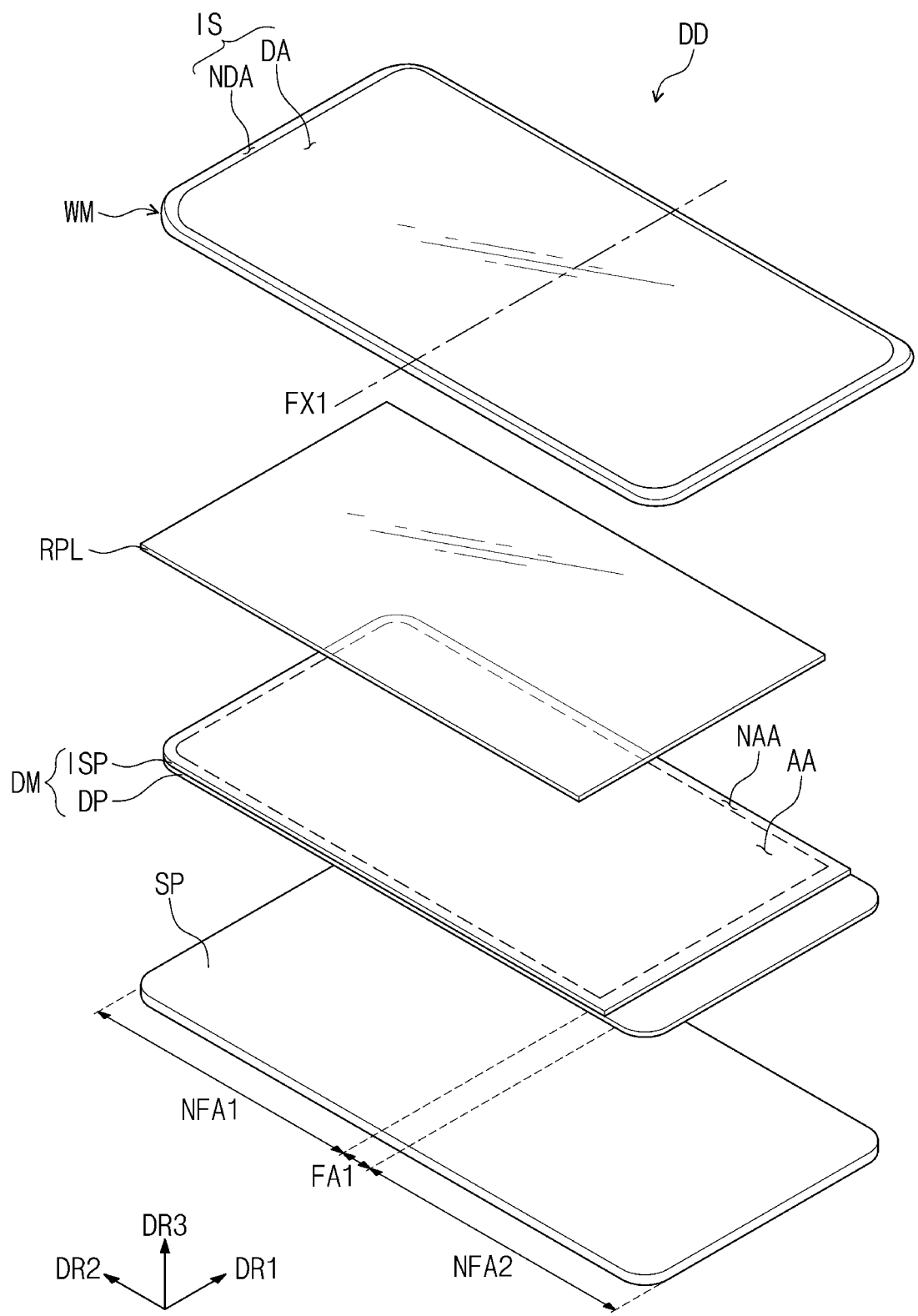
FIG. 3 is an exploded perspective view of an embodiment of a display device.

FIG. 3 is an exploded perspective view of an embodiment of a display device DD. The display device DD may include a support part SP (e.g., supporter), a display module DM, an antireflection layer RPL and a foldable window WM which are sequentially stacked along the third direction DR3. That is, the support part SP, the display module DM, the antireflection layer RPL and the foldable window WM are in order along the third direction DR3.

The display module DM may include a display panel DP and an input sensing unit ISP (e.g., input sensing layer). The input sensing unit ISP may be disposed on the display panel DP to be closer to the foldable window WM than the display panel DP. The display module DM may generate and/or display an image IM according to an electrical signal and transmit/receive information according to an external input TC.

The display panel DP may be a light-emitting display panel, but is not particularly limited thereto. In an embodiment, for example, the display panel DP may be an organic light-emitting display panel or a quantum dot light-emitting display panel. A light-emitting layer of the organic light-emitting display panel may include an organic light-emitting material. A light-emitting layer of the quantum dot light-emitting display panel may include quantum dots or quantum rods, and the like.

The input sensing unit ISP may be provided or formed on the display panel DP such as through a continuous process so as to be disposed directly on the display panel DP, however, the invention is not limited thereto. As an intervening member, an adhesive film may be disposed between the input sensing unit ISP and the display panel DP to couple the input sensing unit ISP to the display panel DP. Where the input sensing unit ISP and the display panel DP are coupled to each other by an intervening member, the display panel DP and the input sensing unit ISP may be provided independently through separate processes, respectively, and then the input sensing unit ISP may be fixed to the display panel DP by the adhesive film.

The display module DM may have an active area AA and a peripheral area NAA defined therein. The active area AA may be defined as a region or planar area at which an image IM provided from the display module DM is displayed. The display panel DP may generate the image IM and the input sensing unit ISP may sense information based on an external input TC which is provided to the display device DD.

The peripheral area NAA is adjacent to the active area AA. In an embodiment, for example, the peripheral area NAA may surround the active area AA. However, this is illustrated as an example, and the peripheral area NAA may be defined in various shapes and is not limited to any one embodiment. According to an embodiment, the active area AA of the display module DM may correspond to at least a portion of the display area DA, and the peripheral area NAA of the display module DM may correspond to at least a portion of the non-display area NDA.

The foldable window WM may be disposed on the display module DM. The foldable window WM may include an optically transparent insulating material. Accordingly, the image IM generated from the display module DM passes through the foldable window WM and may be visually recognized from outside the display device DD. The foldable window WM may define an outer surface (or front surface) of the display device DD, without being limited thereto.

The foldable window WM may be foldable about the first folding axis FX1. That is, when the shape of the display module DM is changed, the shape of the foldable window WM may be changed accordingly. The foldable window WM may be foldable together with the display module DM.

The foldable window WM allows the image IM from the display module DM to pass therethrough and be visible from outside the display device DD. The foldable window WM also reduces or effectively prevents malfunction or damage to the display module DM due to an external impact by relieving a pressure or force applied to the display device DD from the external impact.

The foldable window WM may have a multi-layered structure. The foldable window WM may include a plurality of films combined with each other by at least one adhesive member therebetween. Detailed descriptions will be given later with reference to FIGS. 4 to 12.

The display device DD may further include one or more functional layers between the display module DM and the foldable window WM. According to an embodiment, the functional layer may be an antireflection layer RPL which blocks external light reflection. The antireflection layer RPL may be disposed between the input sensing unit ISP and the foldable window WM.

The antireflection layer RPL may include a retarder and a polarizer. The retarder may be a film type or a liquid crystal coating type, and include a retarder and/or a retarder. The polarizer may include a stretched synthetic resin film or liquid crystals arranged in an arrangement. The retarder and the polarizer may be achieved using a single polarizing film.

The display device DD may further include a support part SP disposed on the rear surface of the display module DM so as to support the display module DM. The support part SP may be a metal plate. The support part SP may include a stainless steel plate. A strength of the support part SP may be higher than that of the display module DM.

As illustrated in FIG. 3, the support part SP may have a single-layered shape disposed to commonly overlap or correspond to the first and second non-folding areas NFA1 and NFA2 and the first folding area FA1. However, the invention is limited thereto, and the support part SP may include a plurality of support plates respectively corresponding to the first and second non-folding areas NFA1 and NFA2 respectively, and separated from each other with respect to the first folding area FA1. Alternatively, a plurality of openings may be defined in the support part SP at a folding area instead of the support part SP including a plurality of support plates being separated from each other at the first folding area FA1.

Figure 4:
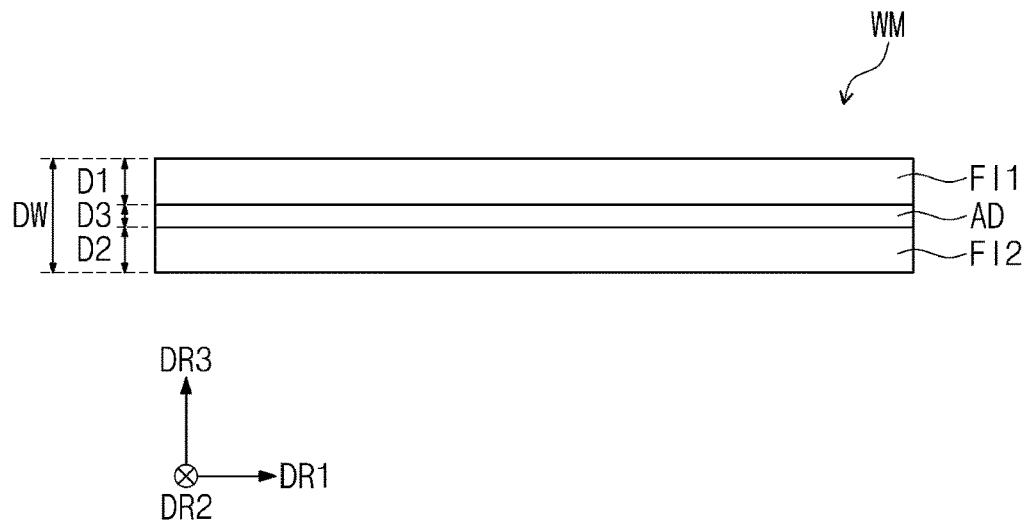
FIG. 4 is a cross-sectional view of an embodiment of a foldable window.

FIG. 4 is a cross-sectional view of an embodiment of the foldable window WM illustrated in FIG. 3. The foldable window WM may include a plurality of films and an adhesive layer AD which bonds the plurality of films to each other. According to an embodiment, the foldable window WM may include a first film FI1, a second film FI2 and an adhesive layer AD. The first film FI1 among the plurality of films is furthest from the display module DM, and the second film FI2 among the plurality of films is closest to the display module DM. The first film FI1 is in contact with the upper surface of the adhesive layer AD and the second film FI2 is in contact with the lower surface of the adhesive layer AD. The first film FI1 may form an outer surface of the foldable window WM and a front surface of the first film FI1 may be exposed to outside the display device DD. As being in contact, elements may form an interface therebetween.

The first film FI1 and the second film FI2 may be optically transparent films. The foldable window WM may be disposed on the display module DM (see FIG. 3). Since the foldable window WM includes an optically transparent film, an image IM provided from the display module DM may be provided to outside the display device DD by passing through the foldable window WM.

The first film FI1 and the second film FI2 may have a modulus which is relatively high. In an embodiment, for example, each of the moduli of the first and second films FI1 and FI2 may be about 7 gigapascals (GPa) or more, such as about 7 GPa to about 15 GPa.

The plurality of films FI1 and FI2 have a high modulus value and may thus reduce or effectively prevent deformation of the foldable window WM and damage thereto from an external impact. Particularly, damage to the display module DM by an external impact caused by concentrating pressure on a small area like a pen (e.g., a pen PEN in FIG. 5) may be reduced or effectively prevented by the plurality of films FI1 and FI2 have a high modulus value. Therefore, the durability and impact resistance of the foldable window WM may be improved. However, when the modulus of the foldable window WM is excessively high, the flexibility thereof is degraded so that the foldable window WM may be damaged by repeated folding and unfolding.

The first and second films FI1 and FI2 may be polymer films that have a high modulus and are also flexible. Each of the first and second films FI1 and FI2 may include a copolymer. In an embodiment, for example, the copolymer may be a polyimide copolymer, a polyamide copolymer or a polyimide-polyamide copolymer. However, the materials of the first and second films FI1 and FI2 are not limited to the examples described above.

In order to bond the first film FI1 and the second film FI2 to each other, the adhesive layer AD may be disposed therebetween. The adhesive layer AD may be an optically transparent adhesive layer. Thus, an image IM passing through the foldable window WM may be visually recognized from outside the display device DD without distortion.

The adhesive layer AD may include an ultraviolet curable resin or a thermosetting resin. In an embodiment, for example, the adhesive layer AD may include an epoxy-based resin or a urethane acrylate-based resin. However, the materials of the adhesive layer AD are not limited to the examples described above.

A thickness DW (e.g., total thickness) of the foldable window WM may be about 40 micrometers (μm) to about 100 μm. The thickness DW of the foldable window WM may be a sum of the thicknesses of the plurality of films within the foldable window WM and at least one adhesive layer. As illustrated in FIG. 4, the thickness DW of the foldable window WM may be the sum of a first thickness D1 of the first film FI1, a second thickness D2 of the second film FI2 and a third thickness D3 of the adhesive layer AD. Each of first, second and third thicknesses may be a maximum thickness of a respective layer, without being limited thereto.

When the thickness DW of the foldable window WM is too small, an external impact may not be sufficiently absorbed and a structure of the display device DD which is disposed below the foldable window WM may be damaged. When the thickness DW of the foldable window WM is too great, repeated folding and unfolding of the foldable window WM may cause deformation thereof.

Each of the first thickness D1 of the first film FI1 and the second thickness D2 of the second film FI2 may be greater than the third thickness D3 of the adhesive layer AD. In an embodiment, for example, each of the first thickness D1 of the first film FI1 and the second thickness D2 of the second film FI2 may be about 10 μm to about 35 μm. When each of the thicknesses of the first film FI1 and the second film FI2 is too small, an external impact may not be sufficiently absorbed, and when each of the thicknesses thereof is too great, light transmittance may be lowered and color distortion may thus occur in an image IM provided to outside the display device DD through the foldable window WM.

The first film FI1 and the second film FI2 may be the same. In an embodiment, for example, each of the first film FI1 and the second film FI2 may include the same material and have the same modulus value. However, the invention is not limited thereto, and the first film FI1 and the second film FI2 may have a different modulus value even when including the same material, the films FI1 and FI2 may include different materials from each other even when including the same modulus values thereof, or both the materials and the moduli thereof may be different from each other.

The third thickness D3 of the adhesive layer AD may be smaller than each of the first thickness D1 and the second thickness D2 of the first film FI1 and the second film FI2, respectively. When the adhesive layer AD has a relatively small thickness, the first film FI1 and the second film FI2 may be thinly adhered. In an embodiment, for example, the third thickness D3 of the adhesive layer may be about 1 micrometer (μm) to about 5 μm.

When the third thickness D3 of the adhesive layer AD is too small, the first film FI1 and the second film FI2 may not be sufficiently bonded at room temperature, and when the third thickness D3 of the adhesive layer AD is too great, the first and second film FI1 and FI2 may be peeled off by repeated folding and unfolding of the foldable window WM. In addition, when the third thickness D3 of the adhesive layer AD is too great, the foldable window WM may be dented or damaged by an external impact, particularly an impact by a sharp object which may extend into layers of the foldable window WM.

The adhesive layer AD, which bonds the first film FI1 having the modulus equal to or more than about 7 GPa to the second film FI2 having the modulus equal to or more than about 7 GPa and forms an interface with both the first film and the second film, has an adhesive strength. The adhesive strength of the adhesive layer AD may be strong. In an embodiment, for example, a strong adhesive strength of the adhesive layer AD may be about 7 newtons per 20 millimeters (N/20 mm) or more. When the adhesive layer AD has strong adhesive strength, the first film FI1 and the second film FI2 may remain strongly adhered in spite of continuous folding and unfolding of the foldable window WM.

Figure 5:
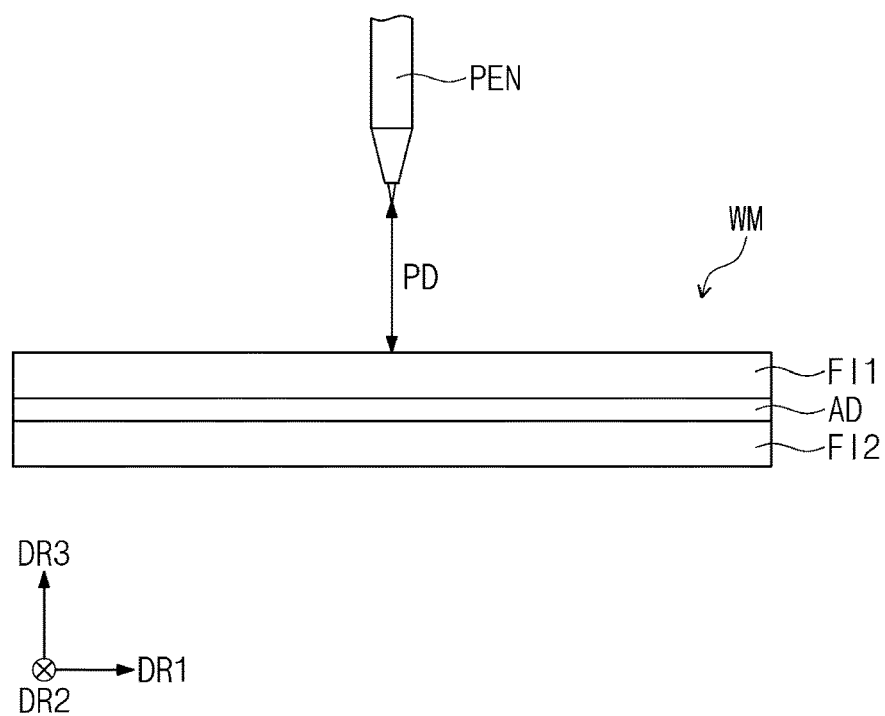
FIG. 5 is a cross-sectional view illustrating an embodiment of a pen drop test for a foldable window.

FIG. 5 is a cross-sectional view illustrating an embodiment of a pen drop test for a foldable window WM. The pen drop test may be carried out by dropping a pen of about 5.8 grams onto the foldable window WM. Through this test, durability and impact resistance may be evaluated by measuring the drop height of the pen PEN at which the foldable window WM is damaged. Particularly, the test may evaluate the durability and impact resistance against pressure applied intensively to a small area of the foldable window WM. When the foldable window WM does not have sufficient durability and impact resistance, damage may be caused to a component disposed below the foldable window WM, for example, the display module DM.

Through the pen drop test performed on the foldable window WM, the drop height of the pen PEN at which the foldable window WM is damaged, may be about 10 centimeters (cm) or more. The drop height may be about 10 cm to about 30 cm, but is not necessarily limited to the above numerical values. One or more embodiment of the foldable window WM may effectively absorb an impact by a sharp object like a pen PEN since a plurality of films having a high modulus are tightly adhered to each other by a thin adhesive layer. Thus, damage to a structure or component of the display device DD which is disposed below the foldable window WM may be reduced or effectively prevented.

Figure 6:
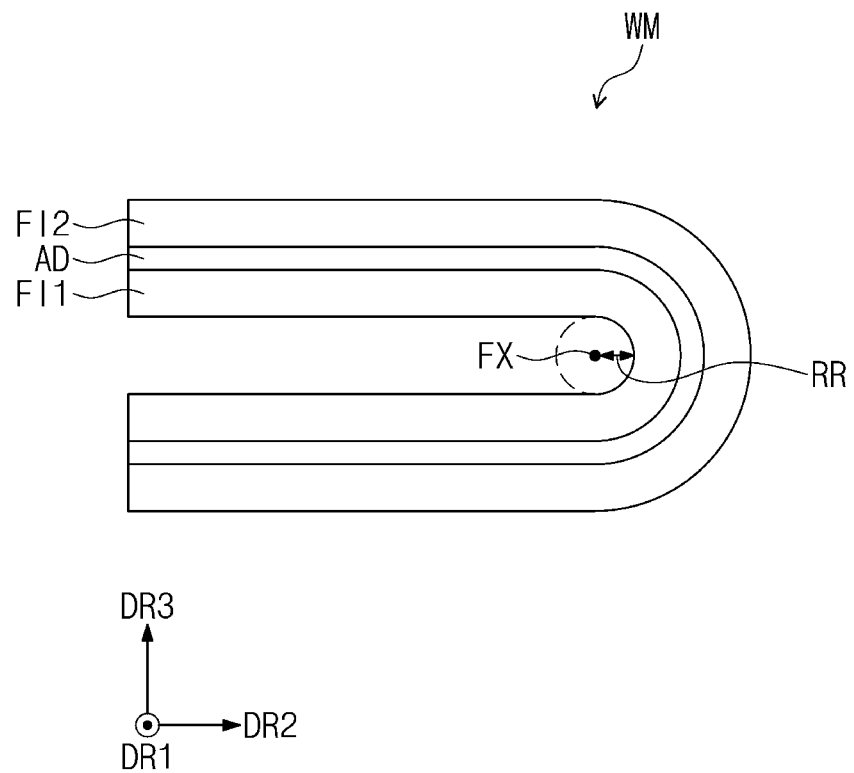
FIG. 6 is a cross-sectional view illustrating a foldable window which is folded.
Figure 7:
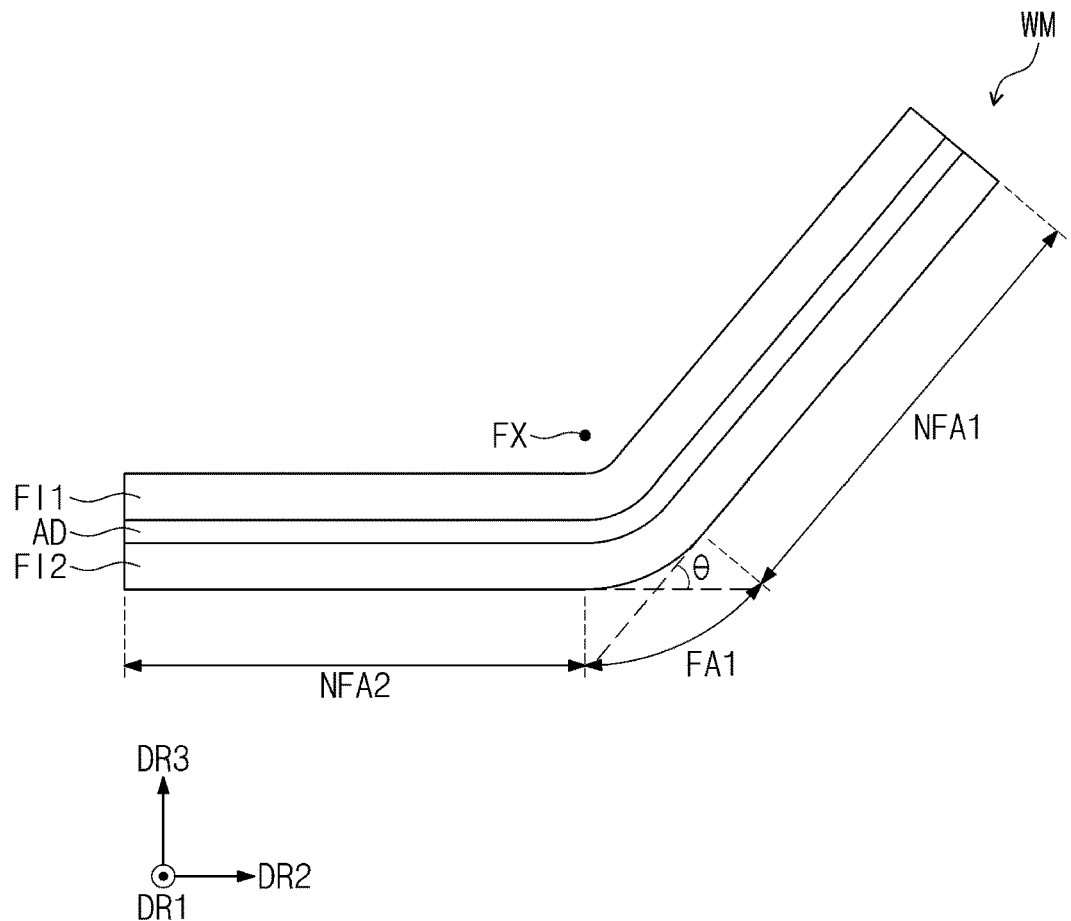
FIG. 7 is a cross-sectional view illustrating a foldable window which is folded.

FIGS. 6 and 7 are cross-sectional views illustrating embodiments of processes in measuring a deformation angle of the foldable window WM. As illustrated in FIG. 6, the foldable window WM may be foldable about the folding axis FX so that some portions of the upper surface of the foldable window WM may face each other.

In order to measure the deformation angle Θ of the foldable window WM, the foldable window WM is folded as illustrated in FIG. 6 in the environment of a humidity of about 93% and a temperature of about 60 degrees Celsius (° C.) such that the radius of curvature RR is about 1 millimeter (mm). Thereafter, a shape of the foldable window WM is fixed so that the foldable window WM is maintained folded for a period of time, and then the foldable window is unfixed and unfolded such as 24 hours later. When unfixed after the period of time, the foldable window WM may be deformed into a shape folded at an angle as illustrated in FIG. 7.

Referring to FIG. 7, the deformation angle Θ means an outer angle formed by the surface parallel to the first non-folding area NFA1 and the surface parallel to the second non-folding area NFA2. When the deformation angle Θ is smaller, the foldable window WM may more easily return to an original shape thereof (e.g., unfolded shape). In an embodiment, for example, when the deformation angle Θ is about 0°, it means that the foldable window WM is flat or unfolded. According to an embodiment, the deformation angle Θ of the foldable window WM may be equal to or less than about 90 degrees (°). The deformation angle Θ thereof may be about 40° to about 90°, but is not limited to the above numerical values.

The following table shows the values of moduli, deformation angles, indentation hardness, bright defect, and pen drop heights of comparative examples and an embodiment of the foldable window WM. The "deformation angle °" is a deformation angle Θ (see FIG. 7) measured by the deformation angle measurement test described above. The "indentation hardness" is a value measured by applying pressure to a region with an indentation body. The "bright defect" is a measured value of a height at which a bright defect appears when a pen PEN of about 5.8 grams is dropped onto a respective foldable window according to the comparative examples and the embodiment example. The "pen drop height cm" is a pen drop height PD (see FIG. 5) measured by the pen drop test described above.

Comparative Examples 1 to 3 of Table 1 below are respective foldable windows composed of films including a single-layered polyimide-based polymer. Embodiment Example 1 is a respective foldable window having a configuration of the foldable window WM illustrated in FIG. 4 and composed of the first film FI1 and the second film FI2 including a polyamide-based copolymer.

TABLE 1

| Classification | Comparative Example 1 | Comparative Example 2 | Comparative Example 3 | Embodiment Example 1 |
| --- | --- | --- | --- | --- |
| Modulus (GPa) | 7.1 | 6.6 | 7.6 | 12.0 |
| Deformation angle (°) | 128 | 120 | 98 | 90 |
| Indentation hardness (HV) | 35 | 45 | 49 | 112 |
| Bright defect (cm) | 0 | 0 | 0 | 1 |
| Pen drop height (cm) | 5 | 5 | 5 | 20 |

Referring to Table 1, it can be seen that Comparative Examples 1 to 3 have a modulus of about 7 GPa. In comparison with this, it can be seen that Embodiment Example 1 has a relatively high modulus of about 12 GPa.

The deformation angles of Comparative Examples 1 to 3 are more than about 90°. That is, it can be seen that the respective foldable windows of the Comparative Examples 1 to 3 are deformed into shapes folded of less than 90° compared to being fully unfolded when an external force with which the respective foldable windows are fixed to be folded is removed. On the contrary, it can be seen that the respective deformation angle of Embodiment Example 1 has a relatively low value. That is, it can be seen that the foldable window WM of the embodiment example has a stronger characteristic of returning to an original shape than those of the comparative examples.

The indentation hardness (in Vickers HV) is a value that shows the hardness of the respective foldable window against a local load. It can be seen that while the indentation hardness of each of Comparative Examples 1 to 3 has a value of about 30 to about 50, the indentation hardness of Embodiment Example 1 is 112 which is relatively very high. From this result, it can be seen that when strong pressure is applied to a small area, Embodiment Example 1 may reduce or effectively prevent damage more effectively than the comparative examples.

The bright defect means a spot displayed as a white spot on a respective display device because a circuit element included in a respective display panel is damaged by an external impact. The values of bright defect listed in Table 1 are pen drop heights at which bright defect appear when a pen PEN of about 5.8 grams is dropped on the respective display devices including the respective foldable windows of the comparative examples and the embodiment example. It can be seen that the pen drop height PD of Embodiment Example 1, at which a bright defect appears, is about 1 cm greater than those of the comparative examples. From this result, it can be seen that Embodiment Example 1 may reduce or effectively prevent a respective display panel from damage more effectively than the comparative examples.

The pen drop height PD means a drop height value at the time when a respective foldable window is damaged by dropping a pen PEN of about 5.8 grams. It can be confirmed that the drop height value of the comparative examples is 5 cm, whereas that of Embodiment Example 1 is increased by 15 cm to 20 cm. From this result, it can be seen that the durability and impact resistance of Embodiment Example 1 are improved when compared with those of the comparative examples.

From the values listed in Table 1, it can be seen that one or more embodiment of the foldable window WM has relatively increased values of the indentation hardness, the drop height of the pen drop test, and the pen drop height PD at which a bright defect appears. In addition, it can also be seen that the deformation angle $\Theta$ is decreased. From this result, it can be seen that by tightly adhering a plurality of high-modulus films to a thin adhesive layer, durability and impact resistance against an external impact may be improved, an intensive impact on a small area may be effectively absorbed, and deformation may be more easily returned to an original shape (e.g., flat or unfolded).

Figure 8:
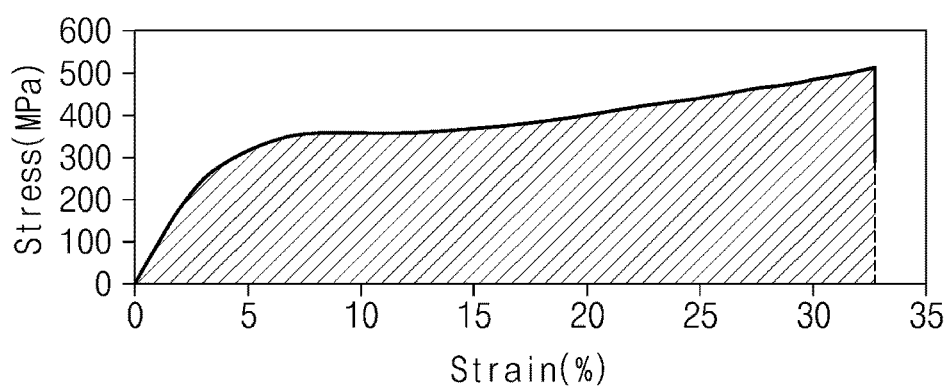
FIG. 8 shows an embodiment of a stress-strain graph of a film of a foldable window.

FIG. 8 is a graph showing strain (in percent, %) against stress (in megapascals, MPa) of a film. The graph shows strain against stress of the film including a polyamide-based copolymer. The modulus of the film has a value of 10 GPa or more. The film corresponds to an example of the first film FI1 or the second film FI2 which is a component of one or more embodiment of the foldable window WM.

Referring to FIG. 8, the area of the graph hatched under the graph line indicates the toughness of the film. The toughness of a film may be expressed as an amount of energy per unit volume until the film breaks. Since the film according to one or more embodiment of the invention has a high toughness, the film does not break easily even if an elastic limit is exceeded. Therefore, a component of the display device DD which is disposed below the foldable window WM may be effectively protected from an external impact.

FIGS. 9 to 12 are cross-sectional views illustrating embodiments of the foldable window WM in FIG. 4. Hereinafter, additional components added to the foldable window WM will be described with reference to FIGS. 9 to 12.

Figure 9:
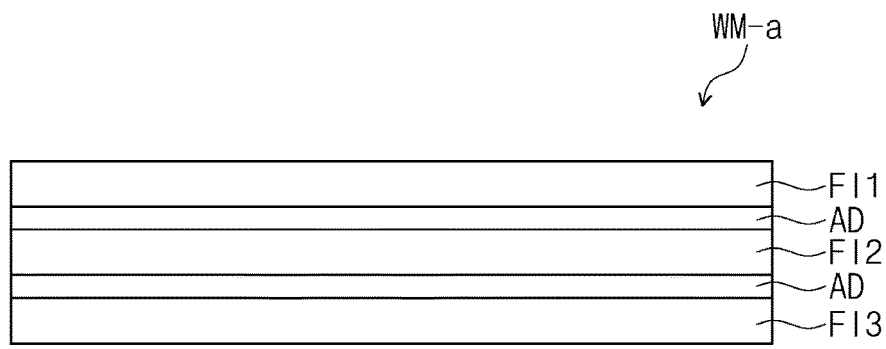
FIG. 9 is a cross-sectional view of an embodiment of a foldable window.
Figure 9:
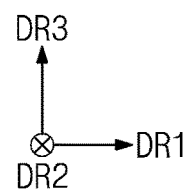

Referring to FIG. 9, the foldable window WM-a may further include a third film FI3 disposed below the second film FI2. The third film FI3 may be bonded to the lower surface of the second film FI2 by the adhesive layer AD. The third film FI3 faces the first film FI1 with the second film FI2 therebetween. The descriptions of the first film FI1 and the second film FI2 given above may apply equally to the third film FI3. The description of the adhesive layer AD given with reference to FIG. 4 may apply equally to the adhesive layer AD which bonds the third film FI3 and the second film FI2 to each other.

As an embodiment, the first to second films FI1 and FI2 or the first to third films FI1, FI2 and FI3 are illustrated as being stacked, but the foldable window WM is not limited thereto and may have a structure in which three or more films are stacked. In an embodiment, for example, the foldable window WM may include a third film FI3 which faces the adhesive layer AD with the first film FI1 therebetween and/or which faces the adhesive layer AD with the second film FI2 therebetween.

Figure 10:
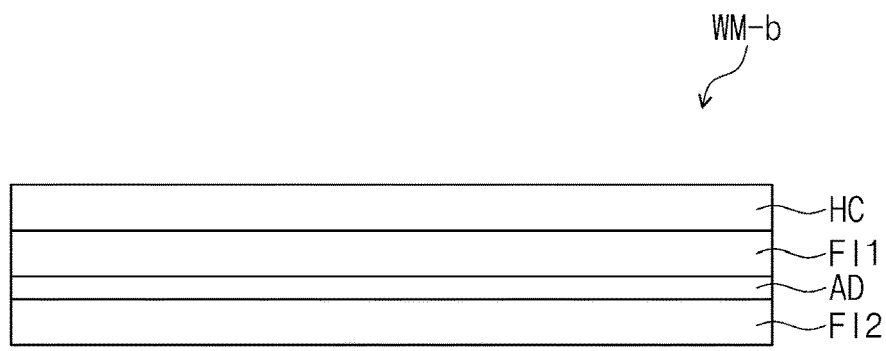
FIG. 10 is a cross-sectional view of an embodiment of a foldable window.
Figure 10:
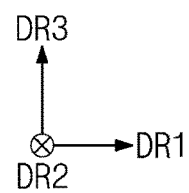

Referring to FIG. 10, the foldable window WM-b may further include a hard coating layer HC disposed on the first film FI1. The hard coating layer HC may form an outer surface of the foldable window WM-b and/or the front surface of the display device DD.

The hard coating layer HC may include a hard-strength material. The hard coating layer HC may protect the first film FI1 disposed below and may increase the overall strength and impact-resistance of the foldable window WM-b. The hard coating layer HC may define an impact-resistant layer of the foldable window WM-b. The hard coating layer HC may include a high-strength material having a pencil hardness of F or higher. In an embodiment, for example, the hard coating layer may include a siloxane resin, an epoxy resin, an acrylic-based resin or the like. However, the materials of the hard coating layer HC are not limited to the above examples.

The hard coating layer HC may additionally include a water-repellent or oil-repellent substance. Thus, the pollution resistance of the hard coating layer HC may be improved, and contamination of the surface thereof which is exposed outside of the display device DD may be reduced or effectively prevented. In an embodiment for example, fluorine-based polytetrafluoroethylene ("PTFE"), polybinylidenefluoride ("PVDF"), amorphous polymers or amorphous fluoroplastics (e.g., Teflon AF®), a fluoropolymer (e.g., Cytop™) and the like may be included as a water-repellent or oil-repellent substance. However, water-repellent or oil-repellent substances are not limited to the above examples. The hard coating layer HC may define a liquid-repellant layer of the foldable window WM-b.

Figure 11:
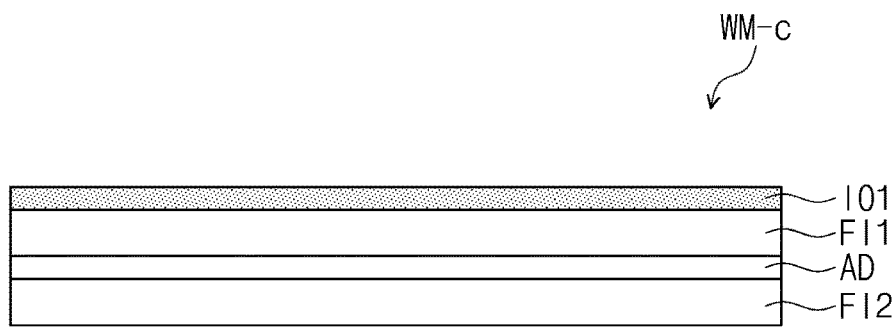
FIG. 11 is a cross-sectional view of an embodiment of a foldable window.
Figure 11:
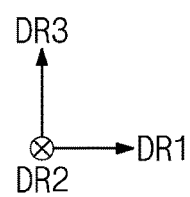

Referring to FIG. 11, the foldable window WM-c may include an inorganic layer 101. The inorganic layer 101 may be in contact with the upper surface of the first film FI1 to form an interface therebetween and separated from the adhesive layer AD with the first film FI1 therebetween. The inorganic layer 101 may be provided or formed on the first film FI1 such as by deposition.

The inorganic layer 101 may protect the plurality of films into which moisture can penetrate more easily as compared with the inorganic layer 101. Thus, permeation of moisture to inside and under the foldable window WM may be reduced or effectively prevented. The inorganic layer 101 may define a moisture-resistant layer of the foldable window WM-c.

The foldable window WM-c further including the inorganic layer 101 has a moisture vapor transmission rate. Here, a moisture vapor transmission rate is an amount of water vapor that passes through a substance or material over a specific period of time. The moisture vapor transmission rate of the foldable window WM-c further including the inorganic layer 101 may have a small value. In an embodiment, for example, the moisture vapor transmission rate of the foldable window WM-c of one embodiment may be about 0.01 gram per meter squared per day (g/m$^2$·day) to about 10 grams per meter squared per day (g/m$^2$·day).

A thickness of the inorganic layer 101 which is taken along the third direction DR3 may be about 5 angstroms (Å) to about 500 Å. When the thickness of the inorganic layer 101 is too small, the effect of protection against moisture permeation may not be sufficiently demonstrated. When the thickness of the inorganic layer 101 is too great, the brittleness thereof becomes high with reduced flexibility, thus having a possibility of causing a crack when folded.

Although not shown, the inorganic layer 101 included in the foldable window WM-c may be disposed in contact with the lower surface of the second film FI2 to form an interface therebetween. In this case, the inorganic layer 101 may be separated from the adhesive layer AD with the second film FI2 therebetween. The inorganic layer 101 included in the foldable window WM-c may be provided in plural, and inorganic layers may be respectively disposed on the upper surface of the first film FI1 and on the lower surface of the second film FI2. That is, the foldable window WM may include an inorganic layer 101 which faces the adhesive layer AD with the first film FI1 therebetween and forms an interface with the first film FI1 and/or which faces the adhesive layer AD with the second film FI2 therebetween and forms an interface with the second film FI2.

Figure 12:
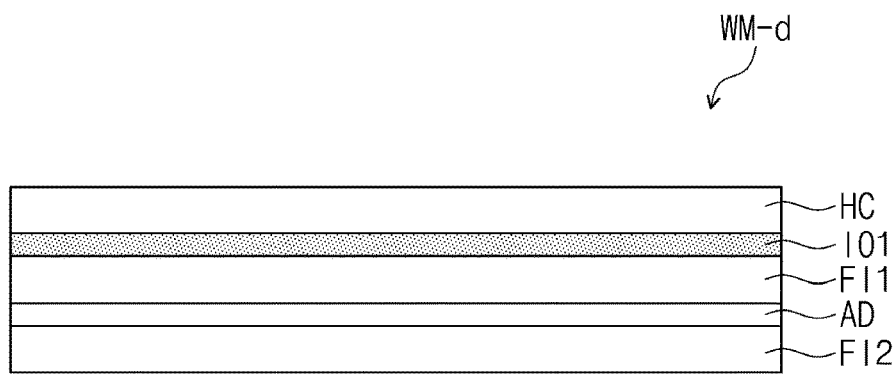
FIG. 12 is a cross-sectional view of an embodiment of a foldable window.
Figure 12:
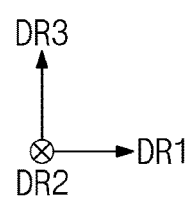

Referring to FIG. 12, the foldable window WM-d may further include a hard coating layer HC and an inorganic layer 101. The inorganic layer 101 may be in contact with the upper surface of the first film FI1 to form an interface therebetween, and the hard coating layer HC may be disposed on the inorganic layer 101 to form an interface therebetween. Since the hard coating layer HC is disposed on the top of the foldable window WM, the structures and layers disposed below the hard coating layer HC may be protected. The descriptions given above with reference to FIGS. 10 and 11 may apply equally to the descriptions of the hard coating layer HC and the inorganic layer 101 included in the foldable window WM-d of FIG. 12.

Figure 13:
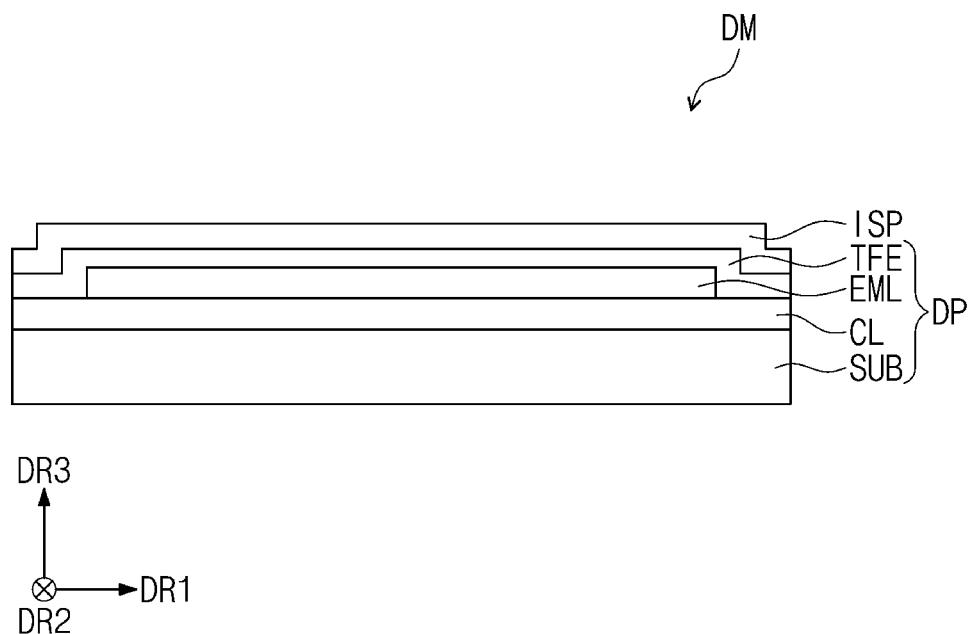
FIG. 13 is a cross-sectional view of an embodiment of a display module.

FIG. 13 is a cross-sectional view of an embodiment of a display module DM. The display module DM may include a display panel DP and an input sensing unit ISP. The input sensing unit ISP may be disposed on the display panel DP. The description of the input sensing unit ISP given with reference to FIG. 3 may apply equally to the description of the input sensing unit ISP.

The display panel DP may include a substrate SUB, a circuit layer CL, a light-emitting element layer EML and an encapsulation layer TFE. The display panel DP may generate an image IM (see FIG. 1) displayed by the display device DD.

The substrate SUB may include a plastic substrate, an organic substrate, a metal substrate, an organic/inorganic composite material substrate or the like. The substrate SUB may include a synthetic resin film and have not only a single-layered synthetic resin film, but also a multi-layered structure. In an embodiment, for example, the synthetic resin film may include polyimide-based, acrylic-based, vinyl-based, epoxy-based, urethane-based, cellulose-based or perylene-based materials, but the materials of the synthetic resin film are not limited to the above examples.

The circuit layer CL may be disposed on the substrate SUB. The circuit layer CL may include an insulating layer, a semiconductor pattern, a conductive pattern, a signal line and the like. The circuit layer CL may include a plurality of transistors including the semiconductor pattern, the conductive pattern, the signal line and the like. In an embodiment, for example, a switching transistor and a driving transistor for driving a light-emitting element of the light-emitting element layer EML disposed on the circuit layer CL may be included within the circuit layer CL.

The light-emitting element layer EML may be disposed on the circuit layer CL. The light-emitting element layer EML may be disposed so as to correspond to the active area AA (see FIG. 3) of the display module DM. The light-emitting element layer EML may include a display element such as a light-emitting element. In an embodiment, for example, the light-emitting element layer EML may include an organic light-emitting material, a quantum dot, a quantum rod, a micro light-emitting diode ("LED") element or a nano LED element.

The encapsulation layer TFE may be disposed on the circuit layer CL so as to cover the light-emitting element layer EML. The encapsulation layer TFE may include inorganic layers and an organic layer which is disposed between inorganic layers, but the layers forming the encapsulation layer TFE are not limited thereto. The inorganic layers may protect pixels and elements thereof within the display panel DP from moisture and/or oxygen. The organic layer may protect pixels from foreign substances such as dust particles. In an embodiment, for example, the inorganic layers may include a silicon nitride layer, a silicon oxide layer, a silicon oxynitride layer, a titanium oxide layer, an aluminum oxide layer or the like. However, the materials of the inorganic and organic layers are not limited to the above examples.

The input sensing unit ISP may be disposed on the display panel DP. The input sensing unit ISP may include a plurality of insulating layers and a plurality of conductive layers. The plurality of conductive layers may include a sensing electrode for sensing an external input TC, a sensing line connected to the sensing electrode, and a sensing pad connected to the sensing line.

Since one or more embodiment of the foldable window WM a plurality of films having a high modulus and bonded by an adhesive layer with strong adhesive strength, the durability and impact resistance thereof may be improved. Particularly, impact resistance against an external impact applied by strong pressure on a small area may be improved.

Since one or more embodiment of the display device DD includes a foldable window WM with improved durability and impact resistance, a display module DM disposed under the foldable window WM may be effectively protected and the impact resistance of the display device DD may be improved.

According to embodiments, the foldable window WM and the display device DD including the same have effects of improving durability and impact resistance.

Although the above has been described with reference to embodiments, those skilled in the art or those of ordinary skill in the art will understand that various modifications and changes can be made to the invention within the scope that does not depart from the spirit and technical field of the invention described in the claims to be described later.

Accordingly, the technical scope of the invention should not be limited to the content described in the detailed description of the specification, but should be determined by the claims as hereinafter described.

What is claimed is:

1. A foldable window of a display device comprising:
a first film having a modulus;
a second film which faces the first film, is closer to a display panel of the display device than the first film and has a modulus; and
an adhesive layer which is between the first film and the second film, and bonds the first film to the second film,
wherein the modulus of the first film and the modulus of the second film are both equal to or more than about 7 gigapascals.

2. The foldable window of claim 1, wherein each of the first film and the second film comprises a polyimide copolymer, a polyamide copolymer or a polyimide-polyamide copolymer.

3. The foldable window of claim 1, wherein each of the first film and the second film has a thickness, and
the thickness of the first film and the thickness of the second film are both equal to or more than about 10 micrometers and equal to or less than about 35 micrometers.

4. The foldable window of claim 1, wherein the modulus of the first film and the modulus of the second film are both equal to or more than about 7 gigapascals and equal to or less than about 15 gigapascals.

5. The foldable window of claim 1, wherein
the adhesive layer which bonds the first film to the second film has a thickness, and
the thickness of the adhesive layer is equal to or more than about 1 micrometer and equal to or less than about 5 micrometers.

6. The foldable window of claim 1, wherein
the adhesive layer which bonds the first film to the second film, forms an interface with both the first film and the second film, and has an adhesive strength, and
the adhesive strength of the adhesive layer is equal to or more than 7 newtons per 20 millimeters.

7. The foldable window of claim 1, wherein the adhesive layer which bonds the first film to the second film comprises an epoxy resin or a urethane acrylate resin.

8. The foldable window of claim 1, wherein the first film and the second film comprise the same material as each other.

9. The foldable window of claim 1, further comprising a third film which faces the adhesive layer with the first film therebetween or which faces the adhesive layer with the second film therebetween,
wherein the third film has a modulus, and the modulus of the third film is equal to or more than about 7 gigapascals.

10. The foldable window of claim 1, further comprising an impact-resistant layer facing the adhesive layer with the first film therebetween.

11. The foldable window of claim 10, wherein the impact-resistant layer comprises a water-repellent or oil-repellent material.

12. The foldable window of claim 1, further comprising an inorganic layer which faces the adhesive layer with the first film therebetween and forms an interface with the first film or which faces the adhesive layer with the second film therebetween and forms an interface with the second film.

13. The foldable window of claim 12, wherein the inorganic layer has a thickness, and
the thickness of the inorganic layer is equal to or more than about 5 angstroms and equal to or less than about 500 angstroms.

14. The foldable window of claim 12, wherein the foldable window which includes the inorganic layer, the first film, the second film and the adhesive layer has a moisture vapor transmission rate,
wherein the moisture vapor transmission rate of the foldable window is equal to or more than about 0.01 gram per meter squared per day and equal to or less than 10 grams per meter squared per day.

15. A display device comprising:
a display module which is foldable; and
a foldable window facing the display module and foldable with the display module,
wherein the foldable window comprises:
a plurality of films facing each other, and
an adhesive layer which is between the plurality of films and bonds the plurality of films to each other, has an adhesive strength of about 7 newtons per 20 millimeters or more and a thickness of about 5 micrometers or less.

16. The display device of claim 15, wherein the foldable window has a thickness including each of the plurality of films and the adhesive layer which bonds the plurality of films to each other, and the thickness of the foldable window is about 40 micrometers to about 100 micrometers.

17. The display device of claim 15, wherein each of the plurality of films has a modulus, and the modulus of each of the plurality of films is about 7 gigapascals to about 15 gigapascals.

18. The display device of claim 15, wherein each of the plurality of films comprises a polyimide copolymer, a polyamide copolymer or a polyimide-polyamide copolymer.

19. The display device of claim 15, wherein the foldable window further comprises an impact-resistant layer facing the display module with each of the plurality of films and the adhesive layer therebetween, and
the impact-resistant layer comprises a water-repellent or oil-repellent material.

20. The display device of claim 15, wherein the foldable window further comprises:
a first film among the plurality of films which is furthest from the display module,
a second film among the plurality of films which is closest to the display module, and
an inorganic layer which faces the adhesive layer with the first film therebetween and forms an interface with the first film or which faces the adhesive layer with the second film therebetween and forms an interface with the second film.

* * * * *